United States Patent
Bråthe et al.

(10) Patent No.: US 9,234,815 B2
(45) Date of Patent: Jan. 12, 2016

(54) TORQUE MEASURING SYSTEM AND A METHOD THEREOF

(75) Inventors: Lars Bråthe, Gothenburg (SE); Stefan Jansson, Kornersville, NC (US)

(73) Assignee: Volvo Lastvagnar AB, Göteborg (SE)

(*) Notice: Subject to any disclaimer, the term of this patent is extended or adjusted under 35 U.S.C. 154(b) by 45 days.

(21) Appl. No.: 14/241,508

(22) PCT Filed: Sep. 1, 2011

(86) PCT No.: PCT/EP2011/004410
§ 371 (c)(1),
(2), (4) Date: Mar. 10, 2014

(87) PCT Pub. No.: WO2013/029643
PCT Pub. Date: Mar. 7, 2013

(65) Prior Publication Data
US 2014/0283621 A1    Sep. 25, 2014

(51) Int. Cl.
*G01M 13/02* (2006.01)
*G01L 3/14* (2006.01)
*G01L 5/00* (2006.01)

(52) U.S. Cl.
CPC ............. *G01M 13/02* (2013.01); *G01L 3/1428* (2013.01); *G01L 5/00* (2013.01)

(58) Field of Classification Search
CPC ....... G01L 3/1428; G01L 5/00; G01M 13/02; G01M 13/022
USPC .......................... 73/862.31, 862.321, 862.324
See application file for complete search history.

(56) References Cited

U.S. PATENT DOCUMENTS

| | | | |
|---|---|---|---|
| 4,683,746 A | 8/1987 | Cullingford et al. | |
| 4,976,160 A | 12/1990 | Dobler et al. | |
| 7,389,682 B2 * | 6/2008 | JaVaherian | 73/117.02 |
| 2004/0000199 A1 * | 1/2004 | Otto et al. | 73/862.191 |
| 2004/0093841 A1 * | 5/2004 | Clauss | 56/16.4 R |
| 2005/0114004 A1 * | 5/2005 | Bansbach et al. | 701/67 |
| 2007/0068235 A1 * | 3/2007 | Bunyer et al. | 73/116 |
| 2007/0220960 A1 | 9/2007 | JaVaherian | |
| 2009/0013803 A1 * | 1/2009 | Lohr et al. | 73/862.338 |

(Continued)

FOREIGN PATENT DOCUMENTS

DE  10220205 A1  11/2002
WO  0173389 A1  10/2001

OTHER PUBLICATIONS

International Search Report (Jun. 1, 2012) for corresponding International Application PCT/EP2011/004410.

*Primary Examiner* — Lisa Caputo
*Assistant Examiner* — Philip Cotey
(74) *Attorney, Agent, or Firm* — WRB-IP LLP

(57) ABSTRACT

A torque measuring system is provided in a vehicle transmission including a clutch assembly having a two part, rotatable torque transmitting member, the two pans of the member being angularly movable relative to one another against the compression of at least one damper spring pack, and an actuator with a non rotatable cylinder for controlling the clutch. A device for radiating and receiving wave energy is arranged to irradiate the damper spring pack in order to receive a reflected modulation signal proportional to the current resonance frequency of the damper spring pack, and where the modulation signal is arranged to be converted to a torque value by a signal processing device, which torque value corresponds to the actual torque over the clutch.

16 Claims, 3 Drawing Sheets

(56) References Cited

U.S. PATENT DOCUMENTS

| | | | |
|---|---|---|---|
| 2009/0149298 A1* | 6/2009 | Otanez et al. | 477/176 |
| 2009/0314104 A1* | 12/2009 | Lohr et al. | 73/862.338 |
| 2010/0275681 A1* | 11/2010 | Ritschel et al. | 73/115.04 |
| 2012/0103307 A1* | 5/2012 | Javaherian et al. | 123/436 |

* cited by examiner

TORQUE MEASURING SYSTEM AND A METHOD THEREOF

BACKGROUND AND SUMMARY

The present invention relates to a torque measuring device in a vehicle for measuring torque over a transmission arranged between a vehicle engine and a driven wheel of said vehicle.

Automatic transmissions of the Automatic Mechanical Transmission (AMT) type have become increasingly common in heavy-duty vehicles as microcomputer technology has continued to advance and has made it possible, with a control computer and a number of control elements, for example servo motors, to precision-control the engine speed the connection and disconnection of an automated clutch between engine and gearbox and clutch members of the gearbox, relative to one another, so that smooth gearshift is always obtained at the correct rev speed. The advantage with this type of automatic transmission compared to a traditional automatic transmission based on a set of planetary gears and with a hydrodynamic torque converter on the input side is first that, particularly with respect to use in heavy vehicles, it is simpler, more robust and can be produced at substantially lower cost, and second that it has higher efficiency which results in lower fuel consumption.

The automatic mechanical transmission of the type mentioned above strongly reduces the driver's gear shifting work and the driver will not need to worry about selecting the right next gear ratio when driving the vehicle. All this is taken care of within the AMT.

In order to perform gear shifts faster it is known to measure and/or estimate torque at the input shaft of the AMT so as to be able to control engine output torque in a more optimal way in order to achieve zero or almost zero torque in the AMT, when, for example, gear shift is performed without disengaging the clutch arranged between the engine and the AMT. Instead an engagement ring of the engaged gear is disengaged directly, the engine rotational speed is adapted to the new selected gear and the engagement ring of the new gear is engaged in order to engage the new gear. When the new gear is engaged the engine output torque is resumed according to, for example driver demand.

The clutch in an AMT can be of the dry plate clutch type and which is used to facilitate start-off from rest and disengage the transmission from the engine at some or all gear shifts. In general, there is a damper hub integrated in a dry plate clutch. Adequately designed, this damper hub reduces torsional vibrations from the engine and spares the transmission downstream of the clutch. In this context the term "downstream" is defined as a direction after a particular point in the direction of power transfer through the transmission. A damper hub usually has a number of helical springs arranged circumferentially on the driven disc that transfers torque from the engine flywheel to the input shaft of the transmission. Some designs are shown in DE102 20 205.

In order to be able to control disengagement and engagement of engagement rings in the gearbox, the engine torque has to be controlled so that zero or almost zero torque is prevailing over the AMT. One way to measure torque in such transmission arrangement is magnetostriction, which means that the AMT input shaft is magnetized with a predetermined magnetic pattern. Micro twisting of the input shaft as torque is applied is measured with electromagnetic coils arranged outside and in a contactless relationship relative the input shaft. The electromagnetic coils measure changes in permeability of the magnetic pattern, which changes are proportional to the torque twisting the shaft. An example of such a system is disclosed in for example U.S. Pat. No. 4,976,160.

Instead of measuring, the torque on the input shaft an alternative solution is to measure torque over the clutch. U.S. Pat. No. 4,683,746 discloses an arrangement for measuring the torque applied on the input shaft of a transmission by measuring the compression of clutch damper helical springs arranged in the clutch between the engine and the transmission. A certain compression distance of the spring corresponds to a certain torque applied over the clutch.

WO 2001/73389 discloses a sensor for non-contact detection of torque on a shaft by measuring the resonance frequency of a string attached to two collars on the shaft. As the shaft is twisted the string will increase or decrease its pretension, and thereby change its lateral vibration resonance frequency. By measuring the prevailing resonance frequency it is possible to indirectly determine the torque applied over the shaft. The string is radiated with microwave energy and a modulation of the microwave signal is caused by the mechanic oscillation of the string. The modulation is translated to a corresponding torque value by a signal processing device.

The known examples suffer from various drawbacks, such as slow response times, insufficient accuracy for use in AMT transmissions, expensive sensor components or complex and/or sensitive sensor arrangements.

It is desirable to come up with an alternative relatively cheap, robust, sufficiently accurate and fast torque measuring device in a vehicle transmission.

The invention, according to an aspect thereof, relates to a torque measuring system a vehicle transmission comprising a clutch assembly having at least a two part, rotatable torque transmitting member. A first part can be a part of or be connected to a flywheel driven by a prime mover, such as an engine. A second part can be a part of or be connected to an input shaft for a transmission, such as a gearbox. The transmission can be an automatic mechanical transmission. The two parts of said torque transmitting member are angularly movable relative to one another against the compression of at least one damper spring pack. An actuator with a non rotatable cylinder is provided for controlling the clutch. Although the torque measuring system according to the invention is primarily intended for friction clutch assemblies, the invention can also be applied to hydrodynamic clutches and torque converters.

A device for radiating and receiving wave energy is arranged to irradiate said damper spring pack in order to receive a reflected modulation signal proportional to the current resonance frequency of said damper spring pack, and where said modulation signal representing a measured mechanical resonance frequency is arranged to be converted to a torque value by a signal or data processing device, which torque value corresponds to the actual torque over said clutch. Torque values are determined continuously while the part comprising spring packs is rotated, in order to monitor the torque over the clutch. The resulting torque values can be used in a target gear selection function, for instance for determining when a gear change can be carried out.

The torque measuring system according to the invention is characterized in that a device for exciting, or radiating, and receiving wave energy is arranged to radiate a damper spring pack of a clutch. Suitable devices for this purpose are devices for emitting electromagnetic radiation, such as pulsed electromagnetic radio waves, microwaves, millimetric or sub-millimetric radio waves. Alternatively, devices for emitting acoustic signals can be used, for instance, for emitting ultrasonic signals. The device can comprise separate transmitter and receiver units arranged spaced apart or an integrated transmitter and receiver unit. In the subsequent text these alternatives will be referred to by the collective term "device".

Said wave energy is reflected back from the damper spring pack in order for the device to receive a modulation signal, for instance an amplitude modulation signal, created by a current mechanical resonance frequency of said damper spring pack. Said measured mechanical resonance frequency is translated by a signal processing device to a torque value, which corresponds to the actual torque prevailing over said clutch.

The device for radiating and receiving wave energy is arranged in a suitable location from which a transmitted signal can reach the at least one spring pack and be reflected back to said device. According to a first example, the device for radiating and receiving wave energy is arranged between said spring packs and a radial diaphragm spring connecting the actuator and the clutch. According to a second example, the a radial diaphragm spring connecting the actuator and the clutch is arranged between said spring packs and said device for radiating and receiving wave energy.

Due to tolerances in the production of these spring packs and tolerances in the spring pack mounting, variations in the compression and/or resonance frequency for a certain torque over the clutch can occur between said different spring packs for a certain torque.

According to one example the signal processing device can be programmed to calibrate the measurements for one of the spring packs in the clutch. The device for radiating and receiving wave energy is then arranged to radiate wave energy to a single spring pack, whereby a torque value is determined for said spring pack. Said spring pack can for example be identified as the one with the lowest or highest mechanical resonance frequency.

In a further example and in order to be able to program the signal processing device so that it can identify the right, damper spring pack, a first distance between two of the six spring packs can differ somewhat compared to the other distances between the spring packs, which other distances can be equal. In this way, when the clutch is rotating, the time passing by between when a first spring pack has passed and to when the next spring pack passes can be identified. Thus, the right spring pack can be the one which follows after said first distance, which differs from the other distances. Said first distance can be longer or shorter compared to the other distances.

In a further example and in order to be able to program the signal processing device so that it can identify the right damper spring pack, a marker can be arranged adjacent the right damper spring pack. This marker can be a projection or a recess/aperture in the outer plate which affects the modulation of the electromagnetic radiation in such a way as to be identifiable. In this way, when the clutch is rotating, the right spring pack can be identified as the one that follows the marker in the direction of rotation.

Alternatively, the device for radiating and receiving wave energy is arranged to radiate wave energy to at least two spring packs, whereby the signal processing device is arranged to determine an average torque value for said spring packs. Ultimately, this can involve radiating and receiving individual modulation signals to and from each spring pack, respectively.

The reflected modulation signal received by the device is preferably an amplitude modulation signal. As stated above, the device is arranged to radiate wave energy in the form of electromagnetic, radiation or acoustic wave energy towards at least one spring pack.

In order to maintain accurate torque value readings, the signal processing device can be arranged to perform a recalibration when a first vehicle condition corresponding to a first torque level and a second vehicle condition corresponding to a second torque level have been detected. Said first vehicle condition can for example be a condition where zero torque is prevailing and said second vehicle condition where a maximum torque is prevailing. The relationship between the change in resonance frequency corresponding to zero torque and up to the resonance frequency corresponding to the maximum torque is linear so the resonance frequencies corresponding to different torque levels between said two different known torque levels, such as zero torque and maximum torque, can be calculated. The recalibration is necessary since the size of the windows and or the elastic properties of the spring packs can change over time. Such changes can be due to normal wear and the resonance frequency of the spring pack may therefore change accordingly over time.

The invention further involves a torque measuring method for a vehicle transmission comprising a clutch assembly having a two part, rotatable torque transmitting member, the two parts of said member being angularly movable relative to one another against the compression of at least one damper spring pack, and an actuator with a non rotatable cylinder for controlling the clutch The method involves the steps of:
  radiating wave energy towards at least one spring pack by means of a device for radiating and receiving, wave energy;
  receiving wave energy in the form of a modulation signal reflected from said at least one spring pack by means of said device which modulation signal is proportional to the current resonance frequency of said damper spring pack;
  transmitting the modulation signal to a signal processing device; and
  converting the modulation signal to a torque value using said signal processing device, which torque value corresponds to the actual torque over said clutch.

According to a first example, the method involves radiating wave energy to a single spring pack and determining a torque value based on the modulation signal from said single spring pack. According to a second example, the method involves radiating wave energy to at least two spring packs and determining an average torque value based on the modulation signals from each spring pack. As stated above, torque values are determined continuously while the part comprising spring packs is rotated, in order to monitor the torque over the clutch. The resulting torque values can be used in a target gear selection function, for instance for determining when a gear change can be carried out.

The torque measuring method preferably involves receiving an amplitude modulation signal reflected from said at least one spring pack.

The method can involve radiating wave energy in the form of electromagnetic radiation or acoustic wave energy towards at least one spring pack.

According to the torque measuring method, a recalibration can be performed when two different vehicle conditions have been detected, where a first vehicle condition has a first torque level and a second vehicle condition has a second torque level which torque levels differ by a predetermined amount, as discussed above.

The invention also involves a computer program comprising program code means for performing all the steps of the torque measuring method described above, when said program is run on a computer.

The invention further involves a computer program product comprising program code means stored on a computer readable medium for performing all steps of the torque measuring method described above, when said program product is run on a computer.

The invention further involves a computer system for implementing the torque measuring method described above, said computer system comprising a suitable storage medium for storing a program for controlling a target gear selection function for the vehicle, and for receiving and storing modulation signals proportional to the current resonance frequency of at least one damper spring pack, wherein a signal processing device operable to run said program for converting said modulation signals to torque values and to control the target gear selection based on said torque values.

The advantage with the device according to the invention is that the response times and the accuracy for torque measurement is improved, which in turn allows for faster and more accurate gear changes in an AMT transmissions. The use of expensive sensor components or complex and/or sensitive sensor arrangements can be avoided, as the invention merely requires a single device for radiating and receiving wave energy arranged within sensor range from a spring pack. As the device is not required to be located in the immediate vicinity of a shaft, as in the case of a Hall sensor or a magnetorestrictive sensor, less space is required for the system according to the invention.

DESCRIPTION OF THE DRAWINGS

The invention will now be described in detail with reference to the appended drawing figures. It is understood that the drawing figures are only illustrations and are not intended to define the scope of the invention, which is defined by the claims appended below. It is further understood that the drawing figures are not necessarily drawn to scale, and that, unless otherwise indicated, the drawing figures only show schematic illustrations of constructions and methods described herein.

DETAILED DESCRIPTION

Figure 1:
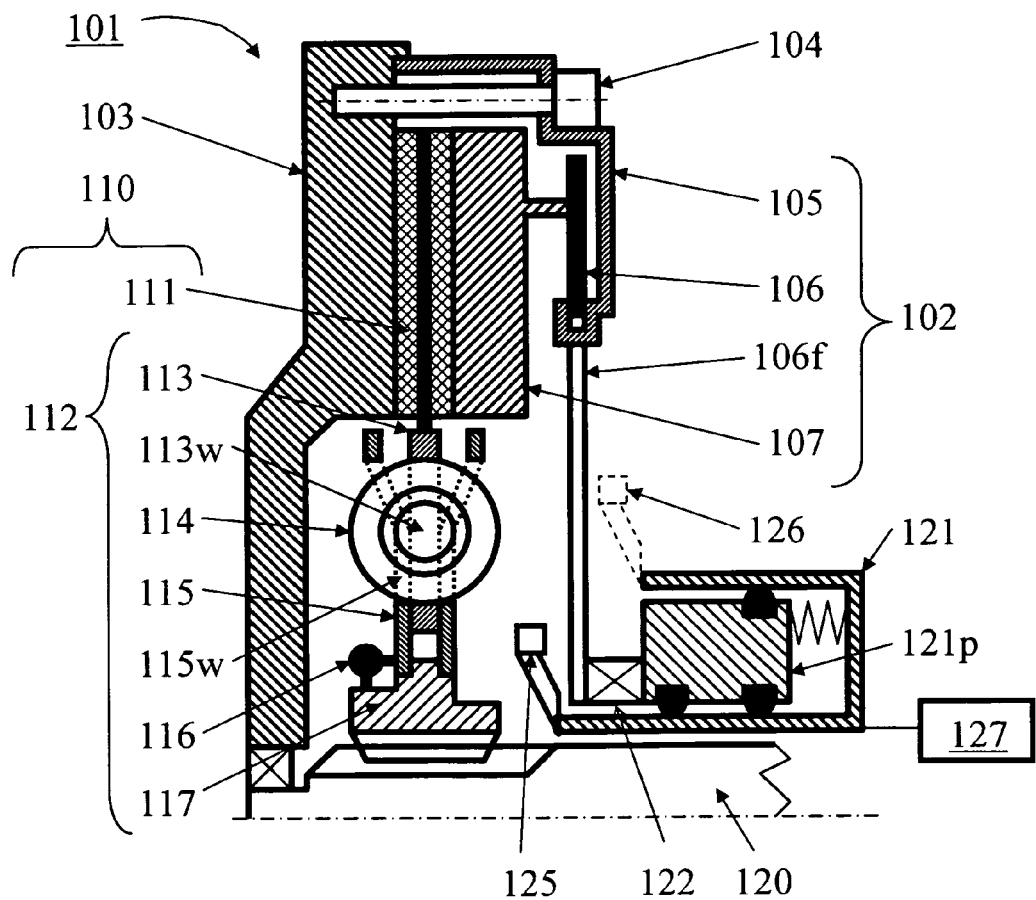
FIG. 1 shows a schematic longitudinal section of a conventional single-disc dry plate clutch with a torque measuring device according to the invention.

FIG. 1 shows a simplified longitudinal section of a single-disc dry plate clutch 101 (friction clutch assembly), which as such is known art. There, a clutch cover assembly 102 is fastened to a flywheel 103 by means of screws 104. The clutch cover assembly 102 is composed of a clutch cover 105, a diaphragm spring 106 and a pressure plate 107.

The diaphragm spring has fingers 106f extending radially inwards. A clutch device (not shown) rotationally connects the pressure plate 107 to the clutch cover 105 and allows a limited axial relative motion. Furthermore, there is a driven disc 110 that is composed of a friction plate 111 and a damper hub 112.

An inner plate 113 of the damper hub 112 is connected fixedly to the friction plate 111. Spring packs 114 are carried in windows 113w in the inner plate 113. The spring packs 114 are also carried by outer plates 115 in corresponding windows 115w. Each spring pack 114 can be composed of a single helical spring or of two or more helical springs placed inside each other. The outer plates 115 are connected via a symbolically shown pre-damper 116 to an inner hub 117. Finally, the inner hub 117 is axially moveable but rotationally fixed to an input shaft 120 of a not shown transmission.

The clutch 101 is controlled by an actuator 121 whose piston 121p via a release bearing 122 pushes the fingers 106f of diaphragm spring 106 for the disengaging the clutch.

In the example shown in FIG. 1, a device 125, 126 for radiating and receiving wave energy is arranged to irradiate one of the damper spring packs 114a in order to receive a reflected modulation signal proportional to the current resonance frequency of said damper spring pack 114a, and where said modulation signal representing a measured mechanical resonance frequency is arranged to be convened to a torque value by a signal or data processing device 127, which torque value corresponds to the actual torque over said friction clutch. Torque values are determined continuously while the inner and outer plates 113, 15 comprising spring packs 114 are rotated, in order to monitor the torque over the clutch 101. The resulting torque values can be used in a target gear selection function, for instance for determining when a gear change can be carried out.

The torque measuring, system according to the invention uses a device 125, 126 for exciting, or radiating, and receiving wave energy is arranged to radiate a damper spring pack of a clutch. Suitable devices for this purpose are devices for emitting electromagnetic radiation, such as pulsed electromagnetic radio waves, microwaves millimetric or sub-millimetric radio waves. Alternatively, devices for emitting acoustic signals can be used, for instance, for emitting ultrasonic signals. The device can comprise separate transmitter and receiver units arranged spaced apart or an integrated transmitter and receiver unit. In the subsequent text these alternatives will be referred to by the collective term "device".

The device 125, 126 for radiating and receiving wave energy is arranged in a suitable location from which a transmitted signal can reach the at least one spring pack and be reflected back to said device 125, 126. According to a first example, the device 125 for radiating and receiving wave energy is arranged between said spring packs 114 and a radial diaphragm spring 106f connecting the actuator 121 and the clutch 101. According to a second example, the radial diaphragm spring 106f connecting the actuator 121 and the clutch 101 is arranged between said spring packs 114 and a device 126 (shown in dotted lines) for radiating and receiving wave energy in both cases, the device 125, 126 for radiating and receiving wave energy is connected to said data-processing unit 127.

Figure 2:
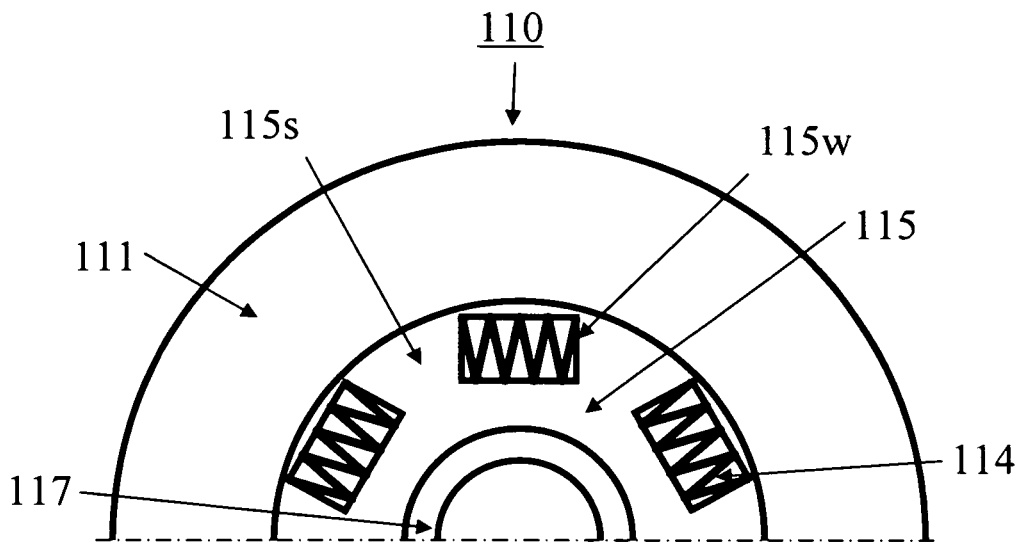
FIG. 2 shows an axial view of the conventional driven disc in FIG. 1.

FIG. 2 shows an axial view of the driven disc 110. As can be seen that there is a number of spring packs 114 arranged in corresponding windows 115w of the outer plates 15. In general, the larger the number of spring packs is the larger torques can be handled by the driven disc.

When the clutch 101 is engaged, the diaphragm spring 106 urges the pressure plate 107 to clamp the friction plate 111 of the driven disc 110 towards the flywheel 103. Thereby, torque can be transferred from the flywheel 103 via the friction plate 111 to the inner plate 113. A relative angular motion between the inner plate 113 and the outer plates 115 will compress the spring packs 114. Thereby, at each instant the torque that is transferred is dependent on the compression of the spring packs 114. A large torque corresponds to a large compression, and vice versa. On the outer plates 115, the threes from the compressed spring packs 114 are carried by shoulders 115s between the windows 115w.

Figure 3:
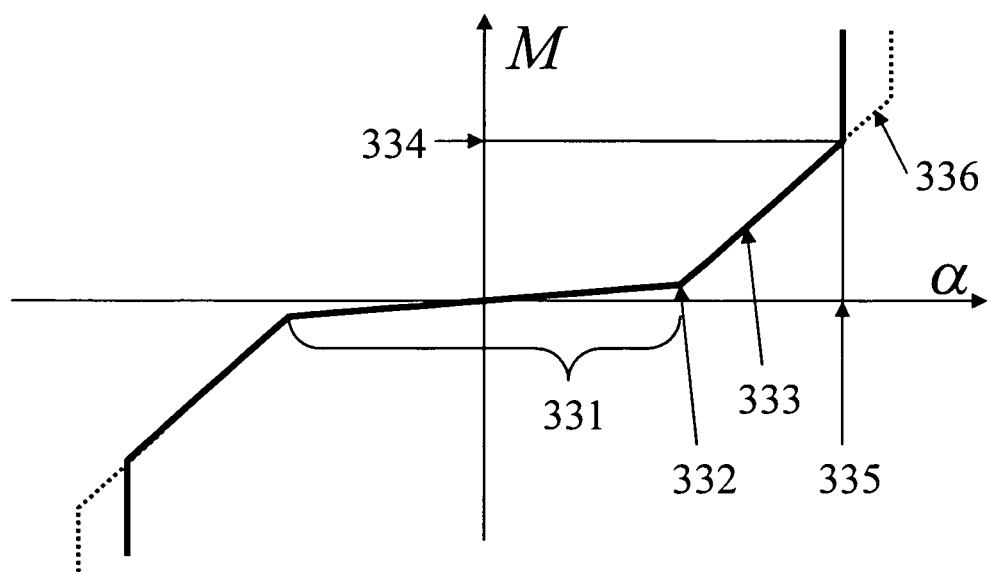
FIG. 3 shows a typical relationship between torque and relative rotational displacement for a damper hub like the one in FIG. 1.

FIG. 3 shows a curve indicating typical known relationship between transferred torque M and relative angular motion between the inner plate 113 and the inner hub 117. At low levels of torque, indicated by section 331 of the curve, the pre-damper 116 is active and allows a fairly large relative motion. The pre-damper 116 will reduce rattling noise from the gear meshes of the transmission when the engine is idling, or when a zero or near zero torque condition occurs in the transmission. At a predetermined load point 332 the torque is sufficient to start to compress spring packs 14. The transferred torque will then increase substantially linearly with the relative angular motion along section 333 of the curve up to a stop torque 334 where further compression of the spring packs 114 is mechanically blocked. The corresponding relative angular motion is referred to as the stop angle 335. If the dimensioning of the spring packs is correct the stop angle 335 should normally not be reached. The present invention is aimed at measuring torque mainly along said line 333, were the spring packs 114 are compressed.

When the clutch 101 is engaged (partly or fully) and torque is transmitted from the engine to the input shaft 120 the spring packs 114 are compressed in an axial direction of each spring pack. Said compression in the axial direction of a spring pack is proportional to the torque applied over the clutch. The torque applied over the clutch is also prevailing over the input shaft to the transmission. During propulsion the vibrations from the engine causes the spring packs to oscillate in a lateral direction. According to known laws of physics a spring pack will oscillate at its mechanical resonance frequency, which frequency is dependent of the compression of the spring pack, and, thus also, of the torque applied over the clutch.

According to the invention the current resonance frequency of at least one of the spring packs 114 can be measured using a device 125, 126 for radiating and receiving electromagnetic radiation. With reference to FIG. 1, the device 125 can in a first example be attached to the stationary housing of the actuator 121, which housing extends axially past the radial fingers 106f of the diaphragm spring 106. From this position the device 125 can be placed in free view of the spring packs 114, so that the electromagnetic radiation can be radiated and received unimpeded.

According to an alternative example, the device 126 can be attached to the stationary housing of the actuator 121 outside the radial fingers 106f of the diaphragm spring 106. From this position the device 126 can radiate and receive electromagnetic radiation to and from the spring packs 114 through gaps between the radial fingers 106f of the diaphragm spring 106. In this example, reflected signals from the radial fingers 106f must be filtered from the desired reflected signals from the spring packs.

In order to increase the accuracy further, it is also possible to use two or more devices to determine the current mechanical resonance frequency of the same spring pack or for multiple spring packs. This can include using one or more devices for determining the current mechanical resonance frequency of all spring packs individually in order to achieve an average torque value. The latter arrangement can also be used for monitoring the state of each spring pack.

Said device is arranged to radiate said damper spring pack in order to receive a reflected amplitude modulation, which is created by said current mechanical resonance frequency of said damper spring pack. Said modulation and thus measured mechanical resonance frequency is translated by a signal processing device to a torque value, which corresponds to the actual torque prevailing over said friction clutch. In the example shown in FIG. 1 there are six damp spring packs.

Due to tolerances in the production of these spring packs and tolerances of the size of the windows 113w and 115w, the compression and/or resonance frequency for a certain torque over the clutch can vary between said different spring packs for a certain torque. According to one example the signal processing device can be programmed to calibrate the measurements for one of the spring packs in the clutch.

Said spring pack can for example be identified as the one with the lowest or highest mechanical resonance frequency.

In a further example and in order to be able to program the signal processing device so that it can identify the right damper spring pack, a first distance between two of the six spring packs can differ somewhat compared to the other distances between the spring packs, which other distances can be equal. In this way, when the clutch is rotating, the time passing by between when a first spring pack has passed and to when the next spring pack passes can be identified. Thus, the right spring pack can be the one which follows after said first distance, which differs from the other distances. Said first distance can be longer or shorter compared to the other distances.

In a further example and in order to be able to program the signal processing device so that it can identify the right damper spring pack, a marker can be arranged adjacent the right damper spring pack. This marker can be a projection or a recess/aperture 115m in the outer plate 115 which affects the modulation of the electromagnetic radiation in such a way as to be identifiable. In this way, when the clutch is rotating, the right spring pack can be identified as the one that follows the marker in the direction of rotation.

According to known art each damper spring pack can sometimes be covered with a metal cap in order, for example, to protect the damper spring packs. Such a metal cap will not let through the electromagnetic radiation and thus a measurement according to the invention would normally not be possible. In a further example and in order to be able to program the signal processing device so that it can identify the correct damper spring pack, a hole or slot can be arranged in the metal cap covering the right spring pack. The size and form of the hole or slot would be sufficient to let through the radiated and reflected electromagnetic radiation. In this way, the only signals that would be measurable would be those modulated by the desired spring pack.

According to a further example, the signal processing device can be programmed to be recalibrated for a certain spring pack according to a preprogrammed schedule. For example, a recalibration can be performed every time two different vehicle conditions have been prevailing, where a first vehicle condition has a first torque level and a second vehicle condition has a second torque level which differs considerably from said first torque level. Said first vehicle condition can for example be a condition where zero torque is prevailing and said second vehicle condition where a maximum torque is prevailing. The relationship between the change in resonance frequency corresponding to zero torque and up to the resonance frequency corresponding to the maximum torque is linear so the resonance frequencies corresponding to different torque levels between said two different known torque levels, such as zero torque and maximum torque, can be calculated. The recalibration is necessary since the size of the windows 113w and 115w or the elastic properties of the spring packs can change over time. Such changes can be due to normal wear and the resonance frequency of the spring pack 114 may therefore change accordingly over time.

The torque measuring system uses a device for exciting, or radiating, and receiving wave energy which device is arranged to radiate a damper spring pack of a clutch. Suitable devices for this purpose are devices for emitting electromagnetic radiation, such as pulsed electromagnetic radio waves, microwaves, millimetric or sub-millimetric radio waves. Alternatively, devices for emitting acoustic signals can be used for instance, for emitting ultrasonic signals. The device can comprise separate transmitter and receiver units arranged spaced apart or an integrated transmitter and receiver unit. In the attached figures a single device is shown, but the invention is not limited to this example.

Figure 4:
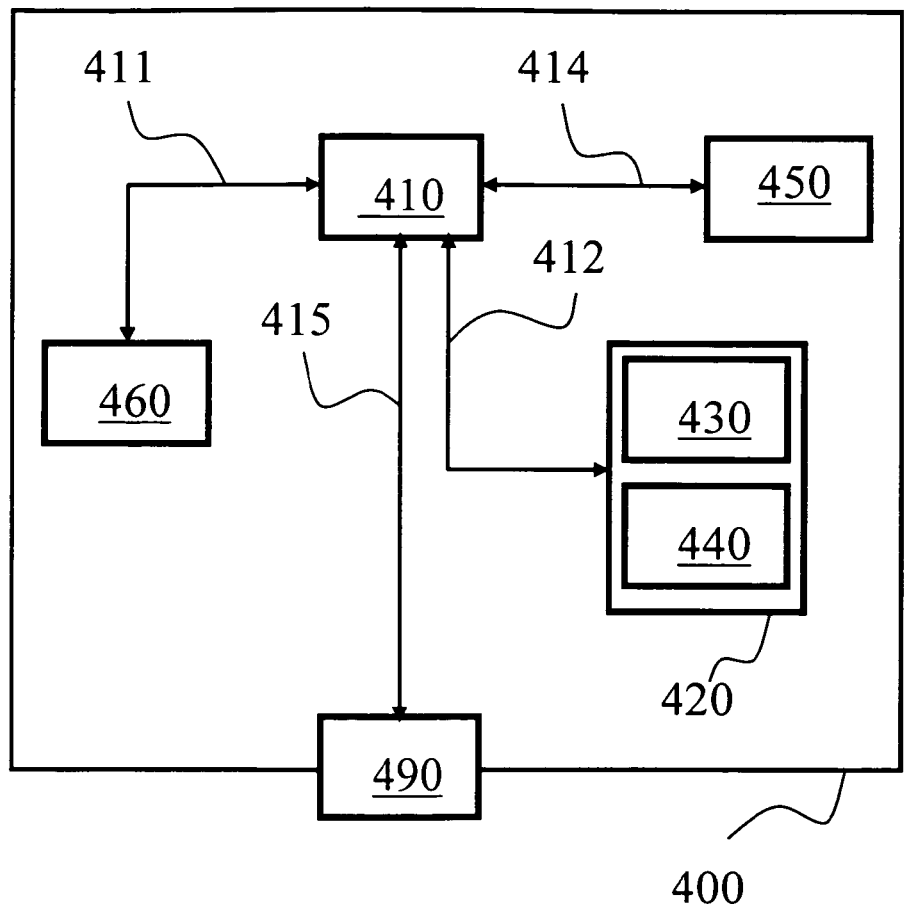
FIG. 4 shows a diagram of an embodiment of the invention with a device for exciting and receiving electromagnetic radiation and a signal processing device.

The present invention also relates to a computer program, computer program product and a storage medium for a computer all to be used with a computer for executing said method. FIG. 4 shows the invention applied on a computer arrangement.

FIG. 4 shows an apparatus 400 according to one embodiment of the invention, comprising a nonvolatile memory 420, a processor 410 and a read and write memory 460. The memory 420 has a first memory part 430, in which a computer program for controlling the apparatus 400 is stored. The computer program in the memory part 430 for controlling the apparatus 400 can be an operating system.

The apparatus 400 can enclose, for example, a control unit, such as a data-processing unit 410. The data-processing unit 410 can comprise, for example, a microcomputer.

The memory 420 also has a second memory part 440, in which a program for measuring torque according to the invention is stored. In an alternative embodiment, the program for measuring torque is stored in a separate nonvolatile storage medium 450 for data, such as, for example, a CD or an exchangeable semiconductor memory. The program can be stored in an executable form or in a compressed state.

When it is stated below that the data-processing unit 410 runs a specific function, it should be clear that the data-processing unit 410 is running a specific part of the program stored in the memory 440 or a specific part of the program stored in the nonvolatile storage medium 450.

The data-processing unit 410 is tailored for communication with the storage memory 450 through a data bus 414. The data-processing unit 410 is also tailored for communication with the memory 420 through a data bus 412. In addition, the data-processing unit 410 is tailored for communication with the memory 460 through a data bus 411. The data-processing unit 410 is also tailored for communication with a data port 490 by the use of a data bus 415.

The method according to the present invention can be executed by the data-processing unit 410, by the data-processing unit 410 running the program stored in the memory 440 or the program stored in the nonvolatile storage medium 450.

The invention should not be deemed to be limited to the embodiments described above, but, rather a number of further variants and modifications are conceivable within the scope of the following patent claims. For instance, the invention can be applied to clutches having either single friction plates (FIG. 1) or parallel, double friction plates, as long as spring dampers are used. Further, the term "friction clutch assembly" includes any suitable clutch that comprises spring packs. Hence, such clutch assemblies can also comprise a flywheel and friction clutch assembly, where the friction clutch assembly includes a dual mass flywheel (see e.g. DE10013576).

The invention claimed is:

1. A torque measuring system in a vehicle transmission comprising
a clutch assembly having a two part, rotatable torque transmitting member, the two parts of the member being angularly movable relative to one another against the compression of at least one damper spring pack,
an actuator with a non rotatable cylinder for controlling the clutch assembly, wherein compression in an axial direction of the at least one damper spring pack is proportional to a torque applied over the clutch assembly, and wherein the at least one damper spring pack oscillates at its mechanical resonance frequency, the mechanical resonance frequency being dependent upon a degree compression of the at least one damper spring pack and upon the torque applied over the clutch assembly,
a device for radiating and receiving electromagnetic or acoustic wave energy attached to a stationary housing of the actuator, the device being arranged to irradiate the at least one damper spring pack and receive a reflected modulation signal proportional to a current mechanical resonance frequency of the at least one damper spring pack, and
a signal processing device configured to convert the modulation signal to a torque value, the torque value corresponding to an actual torque over the clutch.

2. A system according to claim 1, wherein the device for radiating and receiving wave energy is arranged between the at least one damper spring pack and a radial diaphragm spring connecting the actuator and the clutch.

3. A system according, to claim 1, wherein a radial diaphragm spring connecting the actuator and the clutch is arranged between the at least one damper spring pack and the device for radiating and receiving wave energy.

4. A system according to claim 1, wherein the device for radiating and receiving wave energy is arranged to radiate wave energy to a single spring, pack of the at least one damper spring pack, whereby a torque value is determined for the spring pack.

5. A system according to claim 1, wherein the device for radiating and receiving wave energy is arranged to radiate wave energy to at least two spring packs of the at least one damper spring pack, whereby the signal processing device is arranged to determine an average torque value for the at least two spring packs.

6. A system according to claim 1, wherein the reflected modulation signal received by the device is an amplitude modulation signal.

7. A system according to claim 1, wherein the signal processing device is arranged to perforin a recalibration when a first vehicle condition corresponding to a first torque level and a second vehicle condition corresponding to a second torque level have been detected.

8. A system according to claim 1, wherein the clutch is a friction clutch assembly.

9. Torque measuring method for a vehicle transmission comprising a clutch assembly having a two part, rotatable torque transmitting member, the two parts of the member being angularly movable relative to one another against compression of at least one damper spring pack, and an actuator with a non rotatable cylinder for controlling the clutch assembly, and where compression in an axial direction of the at least one damper spring pack is proportional to torque applied over the clutch assembly, where the at least one damper spring pack oscillates at its mechanical resonance frequency, which mechanical resonance frequency is dependent upon the compression of the at least one damper spring pack and upon the torque applied over the clutch assembly, comprising:

radiating electromagnetic or acoustic wave energy towards the at least one damper spring pack by a device for radiating and receiving electromagnetic or acoustic wave energy, the device being attached to a stationary housing of the actuator;

receiving electromagnetic or acoustic wave energy in the form of a modulation signal reflected from the at least one damper spring pack by the device, the modulation signal being proportional to a current resonance frequency of the damper spring pack;

transmitting the modulation signal to a signal processing device; and converting the modulation signal to a torque value using the signal processing device, the torque value corresponding to an actual torque over the clutch assembly.

10. Torque measuring method according to claim 9, comprising radiating wave energy to a single spring pack of the at least one damper spring pack and determining a torque value based on the modulation signal from the single spring pack.

11. Torque measuring method according to claim 9, comprising, radiating wave energy to at least two spring packs of the at least one damper spring pack and determining an average torque value based on the modulation signals from each spring pack.

12. Torque measuring method according to claim 9, comprising receiving an amplitude modulation signal reflected from the at least one spring pack.

13. Torque measuring method according to claim 9, comprising performing a recalibration when two different vehicle conditions have been detected, where a first vehicle condition has a first torque level and a second vehicle condition has a second torque level which torque levels differ by a predetermined amount.

14. A computer comprising a computer program comprising program code for performing the steps of claim 9.

15. A computer program product comprising program code stored on a non-transitory computer readable medium for performing the steps of claim 9 when the program product is run on a computer.

16. A computer system for implementing the method of claim 9, comprising a non-transitory storage medium for storing a program for controlling a target gear selection function and modulation signals proportional to the current resonance frequency of at least one damper spring pack, a signal processing device operable to run the program for converting the modulation signals to torque values and to control the target gear selection based on the torque values.

* * * * *